US012589353B2

(12) United States Patent
Nordberg

(10) Patent No.: US 12,589,353 B2
(45) Date of Patent: Mar. 31, 2026

(54) GREENHOUSE AIR HUMIDITY AND/OR TEMPERATURE CONTROL

(71) Applicant: NW Systems Ab Oy, Sundom (FI)

(72) Inventor: Daniel Nordberg, Sundom (FI)

(73) Assignee: NW Systems Ab Oy, Sundom (FI)

( * ) Notice: Subject to any disclaimer, the term of this patent is extended or adjusted under 35 U.S.C. 154(b) by 26 days.

(21) Appl. No.: 18/798,651

(22) Filed: Aug. 8, 2024

(65) Prior Publication Data

US 2025/0073637 A1 Mar. 6, 2025

(30) Foreign Application Priority Data

Aug. 29, 2023 (FI) ..................................... 20237147

(51) Int. Cl.
*B01D 53/30* (2006.01)
*A01G 9/24* (2006.01)
*B01D 53/26* (2006.01)

(52) U.S. Cl.
CPC ............. *B01D 53/30* (2013.01); *A01G 9/246* (2013.01); *B01D 53/261* (2013.01); *B01D 53/265* (2013.01); *B01D 2257/80* (2013.01); *B01D 2258/06* (2013.01)

(58) Field of Classification Search
None
See application file for complete search history.

(56) References Cited

U.S. PATENT DOCUMENTS 4,093,435 A * 6/1978 Marron ................... B01D 53/26
                                                         55/408
4,265,300 A * 5/1981 Kurimoto .............. A01G 9/246
                                                         165/47

4,567,939 A * 2/1986 Dumbeck ................ F24F 11/63
                                                         165/45
5,579,647 A * 12/1996 Calton ................... F24F 3/1423
                                                         62/223
5,650,221 A * 7/1997 Belding ................. B01D 53/28
                                                         162/157.5

(Continued)

FOREIGN PATENT DOCUMENTS

CN        113175704 A       7/2021
WO    WO-2017062476 A1 *  4/2017  ............. F24F 3/147
WO        2020060402 A1    3/2020

OTHER PUBLICATIONS

Search Report from Corresponding Finnish Patent Application No. 20237147, 2 pages, date: Mar. 26, 2024.

*Primary Examiner* — Brit E. Anbacht
(74) *Attorney, Agent, or Firm* — Cooper Legal Group LLC

(57) ABSTRACT

A control arrangement for controlling the temperature and/or humidity conditions of a greenhouse. Greenhouse air flow from the greenhouse is received in a first heat exchanger. Heat is exchanged between the greenhouse air flow and an ambient air flow in the first heat exchanger. The first heat exchanger removes moisture from the greenhouse air flow by condensing. After the exchange of heat in the first heat exchanger, the greenhouse air flow and the ambient air flow are received in a second heat exchanger. Heat is exchanged between the greenhouse air flow and the ambient air flow in the second heat exchanger. The second heat exchanger removes moisture from the greenhouse air flow by adsorption. After the second heat exchanger, the greenhouse air flow returns to the greenhouse.

15 Claims, 4 Drawing Sheets

(56)                    References Cited

U.S. PATENT DOCUMENTS

| | | | | | |
|---|---|---|---|---|---|
| 6,446,385 | B1 * | 9/2002 | Crutcher | A01G 9/246 47/17 |
| 6,751,964 | B2 * | 6/2004 | Fischer | F24F 3/1423 62/271 |
| 7,502,655 | B2 * | 3/2009 | Albright | A01G 7/02 700/110 |
| 7,753,766 | B2 * | 7/2010 | Master | H05K 7/20745 165/8 |
| 7,886,986 | B2 * | 2/2011 | Fischer, Jr. | F24F 3/1423 62/271 |
| 8,327,652 | B2 * | 12/2012 | Nakaguro | B60H 3/02 62/3.61 |
| 8,393,549 | B2 * | 3/2013 | Pieper | F24F 12/003 236/44 C |
| 8,790,451 | B1 * | 7/2014 | Narayanamurthy | B01D 53/263 96/111 |
| 9,109,808 | B2 * | 8/2015 | Gerber | F24F 5/0014 |
| 9,383,116 | B2 * | 7/2016 | Lee | F24F 3/1423 |
| 9,513,065 | B2 * | 12/2016 | Wiley | F28D 21/0014 |
| 9,644,875 | B2 * | 5/2017 | Ito | F25B 13/00 |
| 9,730,397 | B2 * | 8/2017 | Houweling | A01G 9/24 |
| 9,976,822 | B2 * | 5/2018 | Wintemute | F28D 19/041 |
| 2005/0005510 | A1 * | 1/2005 | Brault | A01G 9/246 47/17 |
| 2010/0242507 | A1 * | 9/2010 | Meckler | F24F 3/1423 62/271 |
| 2011/0041395 | A1 * | 2/2011 | Newbold | A01G 31/02 47/1.01 R |
| 2012/0260689 | A1 * | 10/2012 | Veltkamp | A01G 9/246 62/238.7 |
| 2014/0235157 | A1 * | 8/2014 | Wawryk | F28D 1/02 165/54 |
| 2015/0096714 | A1 * | 4/2015 | Dagley | H05K 7/20836 165/8 |
| 2015/0282440 | A1 * | 10/2015 | Shelor | A01G 9/246 47/17 |
| 2015/0375199 | A1 * | 12/2015 | Tan | B01J 20/103 502/402 |
| 2017/0099785 | A1 * | 4/2017 | Zimmerman | A01G 9/246 |
| 2018/0177140 | A1 * | 6/2018 | Gallant | A01G 9/24 |
| 2019/0364746 | A1 | 12/2019 | O'Brien et al. | |

* cited by examiner

GREENHOUSE AIR HUMIDITY AND/OR TEMPERATURE CONTROL

CROSS-REFERENCE TO RELATED APPLICATION

This patent application claims the benefit of priority under 35 U.S.C. § 119 (a)-(d) to Finnish Patent Application No.: FI20237147, filed on 29 Aug. 2023, which is incorporated herein by reference.

TECHNICAL FIELD

The disclosure relates to a method and an arrangement for control of humidity and/or temperature of a greenhouse.

BACKGROUND

Removal of excess moisture from a greenhouse is important for prevention of damage such as growth of mold and fungus, prevention of diseases caused by spread of bacteria and viruses, and controlled evaporation of moisture from the leaf surfaces of the plants to optimize their growth. It is thus evident that there is a need for an efficient method and arrangement for humidity and/or temperature control of a greenhouse.
i.

SUMMARY

In accordance with the disclosure, a method and control arrangement are provided for control of humidity and/or temperature of a greenhouse. The control arrangement includes first piping for receiving greenhouse air flow from the greenhouse and returning the greenhouse air flow back to the greenhouse, and second piping for carrying an ambient air flow for circulating air originating exterior to the greenhouse. A first heat exchanger is connected to the first and second piping for exchanging heat between the greenhouse air flow and the ambient air flow. The first heat exchanger is configured to remove moisture from the greenhouse air flow by condensation. A second heat exchanger is connected to the first piping to be fluidly connected in series with the first heat exchanger downstream of the first heat exchanger in the greenhouse air flow. The second heat exchanger is further connected to the second piping to be fluidly connected to the ambient air flow downstream of the first heat exchanger. The second heat exchanger is provided for exchanging heat between the greenhouse air flow and the ambient air flow. The second heat exchanger is configured to remove moisture from the greenhouse air flow by adsorption.

BRIEF DESCRIPTION OF THE DRAWINGS

The disclosure and its embodiments are shown in the accompanying drawings, where.

DETAILED DESCRIPTION OF ILLUSTRATIVE EMBODIMENTS

The embodiments relate to humidity and/or temperature control of a greenhouse. For optimal growth of the plants and prevention of other problems such as growth of mold or bacteria, dehumidification of the greenhouse is necessary.

Figure 1:
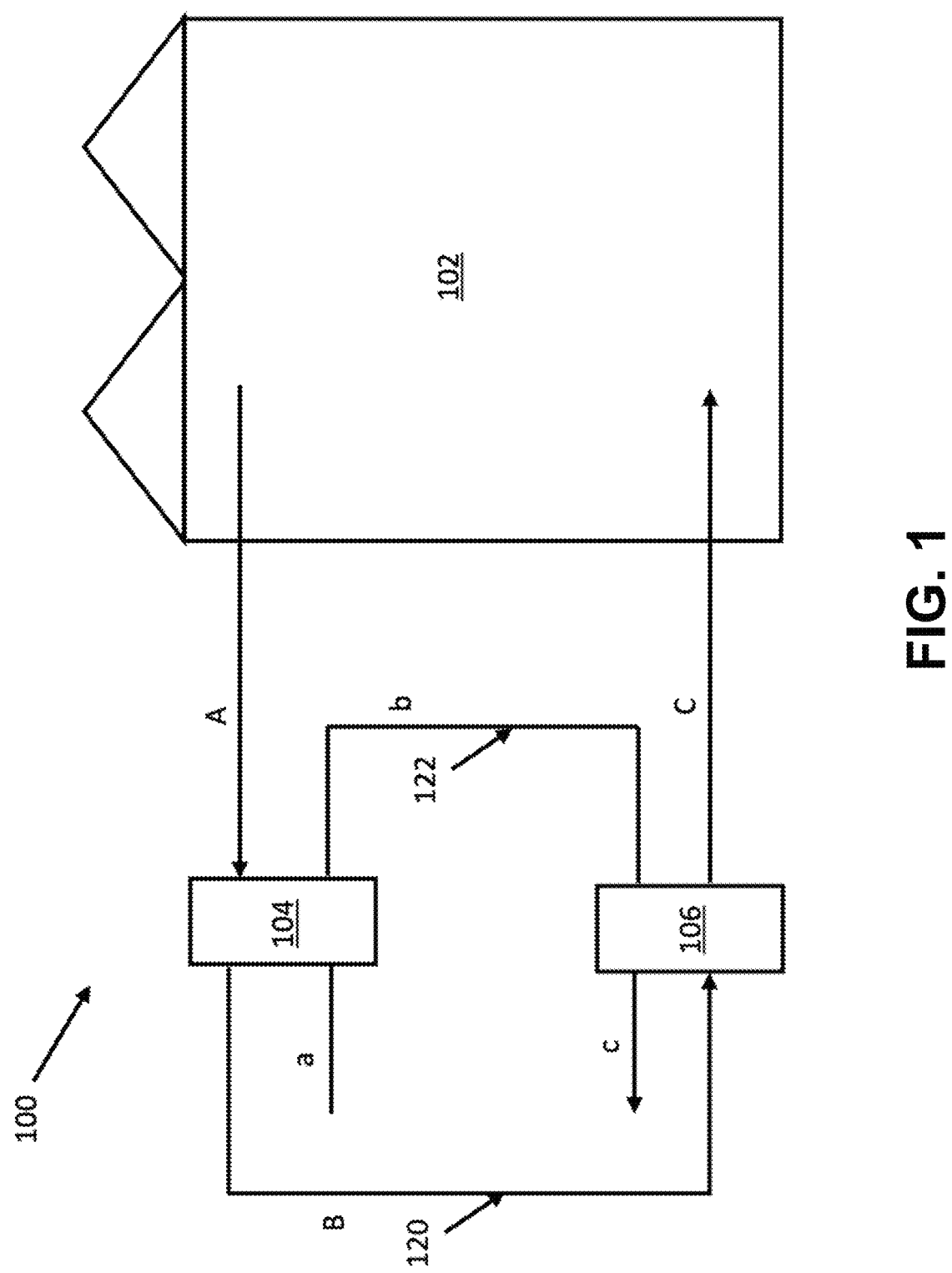
FIG. 1 shows an embodiment of an air humidity and/or temperature control arrangement of a greenhouse.

FIG. 1 shows one embodiment of the dehumidification arrangement 100. There is provided a greenhouse 102, whose interior air is being subject to dehumidification. FIG. 1 shows that a portion of the interior air of the greenhouse is led to and circulated in a greenhouse air flow path 120 such that the air exhausted from the greenhouse in stage "A" passes via a first heat exchanger 104 to a second heat exchanger in stage "B", and then 106 back to the greenhouse in stage "C". FIG. 1 shows also a second air flow path 122 that is an ambient air flow part, where ambient air, being air originating exterior of the greenhouse, is first input to the first heat exchanger 104 in stage "a", and the output air from the first heat exchanger 104 is then input to the second heat exchanger in stage "b", and after passing the second heat exchanger 106, returned to the outside air in stage "c". The greenhouse air flow path and ambient air flow path are arranged to respective piping having inlets and outlets leading to and out of the piping. The ambient air flow thus takes place wholly outside of the greenhouse in the embodiment of FIG. 1.

The arrangement has at least three operation modes, which will be discussed in detail later in connection with FIG. 2. One of the operation modes is a dehumidification mode, and in the exemplary operation of the arrangement of FIG. 1, the first heat exchanger 104 carries out heat exchanging between the warm interior air of flow path 120, and the colder outside air of the air flow path 122, whereby heat is transferred from the interior air to the exterior air. The heat exchanging causes condensation when the warm and cold air come into contact with each other. The condensation may take place in a condensation wheel or a fixed type of heat exchanger, for instance.

After the greenhouse air 120 has passed the first heat exchanger 104, it is led to the second heat exchanger 106 which is downstream of the first heat exchanger both in the greenhouse air flow path and the ambient air flow path. The first and second heat exchangers are thus fluidly connected by piping to each other both in the greenhouse and ambient air flow paths thus allowing the air to flow from the first heat exchanger to the second heat exchanger. The ambient air flow is arranged counter-currently to the greenhouse air flow both in the first heat exchanger and the second heat exchanger.

In the second heat exchanger 106, the greenhouse air is to be heated by the ambient air from the air flow 122. In the second heat exchanger, the heat exchanging takes place by adsorption and thus the second heat exchanger may be a sorption heat exchanger, such as a sorption wheel rotary heat exchanger. Generally, the sorption heat exchanger contains sorption material which has strong affinity for water vapour. The material is typically a desiccant, which is capable of attracting and holding onto water molecules. When the sorption heat exchanger is being used, and the desiccant has become loaded with water molecules, it will need to be regenerated by heating the desiccant material. This causes the water release from the material, which is then vented out from the sorption heat exchanger, which can be condensed back to water by cooling. The desiccant is then cooled for next cycle of water removal.

Specifically, in a rotary wheel sorption heat exchanger, there is provided a rotary wheel which has a matrix having a large surface area for interaction between the desiccant material and air passing through the heat exchanger. When the rotor has adsorbed water and is saturated, the rotor moves those sections to regeneration. In the regeneration, there is a separate process to separate the moisture from the desiccant, which can include passing warm or hot air through the rotor, which releases the moisture. Then the rotor may be cooled for the next cycle. Thus, in a rotary wheel sorption heat exchanger, the wheel rotates cyclically between the adsorption and regeneration zones.

Thus, in the embodiment of FIG. 1, both heat exchangers 104 and 106 are for removing moisture from the greenhouse air flow path, the former by condensation and the latter by absorption. This provides the advantage of very efficient moisture removal in an energy efficient manner.

Specifically, by providing two types of heat exchangers, condensing and adsorption heat exchangers affecting the greenhouse air flow, operational range of the arrangement can be optimized. In environments, where the ambient conditions have big temperature and/or moisture variations due to day/night or summer/winter, two different types of the heat exchangers ensure energy efficient operation in all conditions. For example, the condensing heat exchanger works efficiently during winter time but during summer time a sorption heat exchanger has a better performance.

The arrangement may be operated differently during winter time and summer time. The winter and summer are here defined by an average outside temperature, which can be +5 Celsius, for instance. Temperatures above +5 C may be considered as summer and below +5 C are considered as winter.

As a non-limiting winter time use case example, the parameters (temperature/relative humidity/water content) during winter time in various phases of the flow path 120 are (+18 Celcius (C)/80% RH/10.3 g/kg) in phase A, (+2.6 C/99% RH/4.5 g/kg) in phase B, and finally (9.9 C, 39% RH and 3 g/kg) in stage C when heat exchanged with outside air of −3 C with relative humidity 85%. It can thus be seen that the water content is effectively reduced in two stages, in both heat exchangers 104 and also 106. The initial water content 10.3 g/kg goes down to 4.5 g/kg in the heat exchanger 104 and then further down to 3 g/kg in the second heat exchanger 106.

In the above example, the parameters of the outside air in the stages a, b and c, respectively, are (−3 C)/85% RH/2.3 g/kg) in stage a, (+12.4 C)/26.5% RH/2.3 g/kg) in stage b, and (+5.1 C)/71.9% RH/3.9 g/kg) in stage c. The water content in the outside air has thus been increased in the process.

Figure 2:
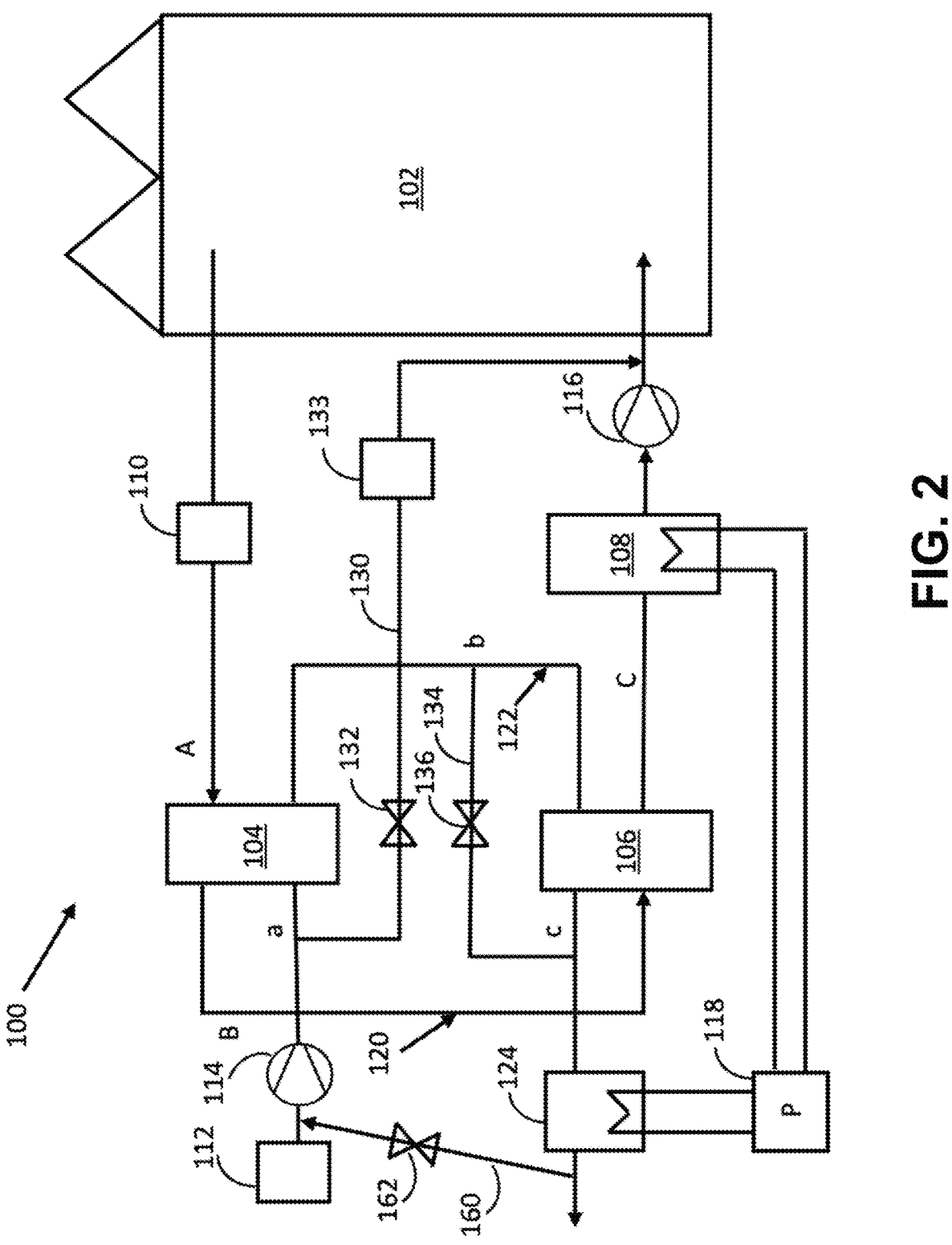
FIG. 2 shows a more detailed embodiment with respect to FIG. 1.

FIG. 2 shows another embodiment of the dehumidification arrangement 100 where the parts sharing the same numbers correspond to those in FIG. 1. In addition to FIG. 1, the embodiment of FIG. 2 has filters 110, 112 to filter the interior air flow A and exterior flow "a", respectively. The filters are provided to remove any impurities from the air flows. The arrangement may also include a fan 114 to increase the volume of the exterior air flow, and/or a fan 116 to affect the flow rate back to the greenhouse 102.

In addition to devices shown in FIG. 1, the embodiment of FIG. 2 also comprises a third heat exchanger 108 to increase the temperature of the air being returned to the greenhouse. The heat exchanger may receive heat from a further heat source, such as a renewal energy heat source or similar. In another embodiment, the arrangement comprises a fourth heat exchanger 124 to recover heat from stream "c".

There may be provided a heat pump 118 which is operationally connected to the third and fourth heat exchangers. The heat pump may extract heat of the flow in the fourth heat exchanger 124 and circulates a fluid between the heat exchangers 108 and 124 to heat up the stream C in the third heat exchanger 108 to a temperature level suitable for the greenhouse, e.g. to 20 C degrees.

In an embodiment, the heat pump 118 is applied for harvesting heat from both third 108 and fourth heat exchangers 124 and store the heat in a heat storage, such as a water tank, for later usage. The arrangement of the heat pump is explained more in detail in connection with FIG. 4.

The arrangement may also comprise a first auxiliary flow path 130 branching from the ambient air flow path 122 upstream of the first heat exchanger 104 and ending downstream of the second 106 or third heat exchanger 108 in the greenhouse air flow path 120. There is provided a valve 132 for controlling the flow volume in the flow path 130. The purpose of the first flow path is to allow a second operation mode "cooling or heat harvest" where the primary intention is, instead of dehumidification, cooling of the air flow, and also securing that the ingoing air to the greenhouse is not too humid. In this second operation mode, the second heat exchanger 106 is stopped or at least substantially stopped, and the ambient air is directed directly to the flow path downstream of the third heat exchanger 108, such as to the outlet of fan 116. In this operation mode the third and fourth heat exchangers 108 and 124 will be used for heat harvesting by the heat pump 118 such that they are arranged to cool the air flows passing through them. FIG. 2 shows also a humidifier 133 arranged downstream of the valve to the first auxiliary flow path 130, which humidifier may be used to add moisture to the flow 130 e.g. during very dry summer days. The humidifier may comprise mist spray nozzles, for instance, for adding humidity to the air flow.

The arrangement may also comprise a second auxiliary flow path 134 starting upstream of the second heat exchanger 106 in the ambient flow path 122 and ending downstream of the second heat exchanger 106 in the ambient air flow path 122. The flow path 134 is thus arranged to circumvent the second heat exchanger 106. There is provided a valve 136 for controlling the flow volume in the flow path 134. The advantage and purpose with the flow path 134 is to alleviate the risk of freezing of and/or defrosting the fourth heat exchanger 124 during very cold winter periods by leading warmer air than what would be normally received from the second heat exchanger 106 in the ambient air flow.

The arrangement may also comprise a third auxiliary flow path 160 starting downstream of the fourth heat exchanger 124 and ending upstream of the first heat exchanger 104 in the ambient air flow path. There is arranged a third valve 162 for controlling the air flow in the third flow path. The purpose of the flow path is to enable use of cold outlet air from the fourth heat exchanger 124 to further improve the dehumidification performance of the first heat exchanger by lowering the temperature in the incoming ambient air flow "a".

In some embodiments, e.g. in summer time, the third heat exchanger 108 can be applied in a cooling mode whereby it is also capable of removing moisture from the greenhouse air flow 120. In an exemplary case with 30 000 kg/h air flow, the first, second and third heat exchangers may be capable of removing 6 kg/h, 87 kg/h and 15 kg/h, respectively.

In a winter operation mode, when the ambient air is colder than in the summer, the first heat exchanger removes most of the water of the greenhouse air. In the same exemplary case as above with 30 000 kg/h greenhouse air circulation, and −3 C ambient air temperature, the first heat exchanger would remove 174 kg/h, and the second heat exchanger 47 kg/h water out of the greenhouse air.

There are three operational modes in the arrangement, which are further explained with reference to the following table, where it is explained how different devices are being operated in the various operation modes. In the below table, HE refers to the respective four heat exchangers 104, 106, 108 and 124, P to the heat pump 118, F1 and F2 to respective fans 116 and 114 and V1 and V2 to respective valves 132 and 136.

| Mode | HE1 | HE2 | HE3 | HE4 | P | F1 | F2 | V1 | V2 |
|---|---|---|---|---|---|---|---|---|---|
| Dehumidif. | On | On | Heat (W) Cool (S) | Cool | HE4–>HE3 (W) HE4 + HE3 (S) | On | On | Cl | Df |
| Cool/Heat harvest | On | Off/ slow | Cool | Cool | HE4 + HE3 (S) to water storage | On | On | Cnt | Cl |
| Ventilation | Off | Off | Off | Off | Off | On | Off | Cl | Cl |

The first operation mode "Dehumidification", the principal operation mode, refers to dehumidification of the greenhouse, that is, removal of water from the greenhouse air. This operational mode may be triggered by the greenhouse humidity exceeding a predetermined threshold value. In this operation mode, the first and second heat exchangers 104 and 106 are operational (ON) but the third and heat exchanger may take different roles depending on the ambient conditions.

During winter time (W in the table) or when the greenhouse temperature drops too low, the third heat exchanger is applied for heating the return air to the greenhouse. In one embodiment, the heat pump 118 is arranged to convey heat energy from the fourth heat exchanger 124 to the third heat exchanger 108. In this mode, the first auxiliary flow path 130 is not needed and the first valve 132 is closed.

During summer time (S in the table), the temperature in the greenhouse may rise over a predetermined threshold value for the temperature, and cooling of the greenhouse air is needed. Then, the pump is arranged to collect heat from both third and fourth heat exchangers 108, 124, and store the excess energy to a heat storage 452, such as a water tank shown in FIG. 4, for instance.

In one use case of the dehumidification mode, during winter time if the fourth heat exchanger 124 is in risk of freezing, the second auxiliary flow path 134 may be opened by the valve 136, whereby the warmer air effectively defrosts (Df in the table) the heat exchanger 124.

In the second operation mode "Cooling/Heat harvest", the second heat exchanger is substantially non-operational meaning that it is either fully stopped or operates with very low intensity (e.g. less than 20%) of the nominal power. The third and fourth heat exchangers are operated in cooling mode where the pump harvest heat energy to a water storage. The first valve 132 is controlled (Cnt in the table) such that the first auxiliary flow path 130 may supply air directly to the input flow to the greenhouse.

In the third operation mode "Ventilation", the goal is to keep air movement ongoing in the greenhouse, which is good for the crop development. This mode is applicable when the temperature and humidity are on appropriate level but air circulation is still beneficial. In this mode all the heat exchangers and pump are off and valves are closed (CI in the table) and only the first fan 116 is in operation.

Figure 3:
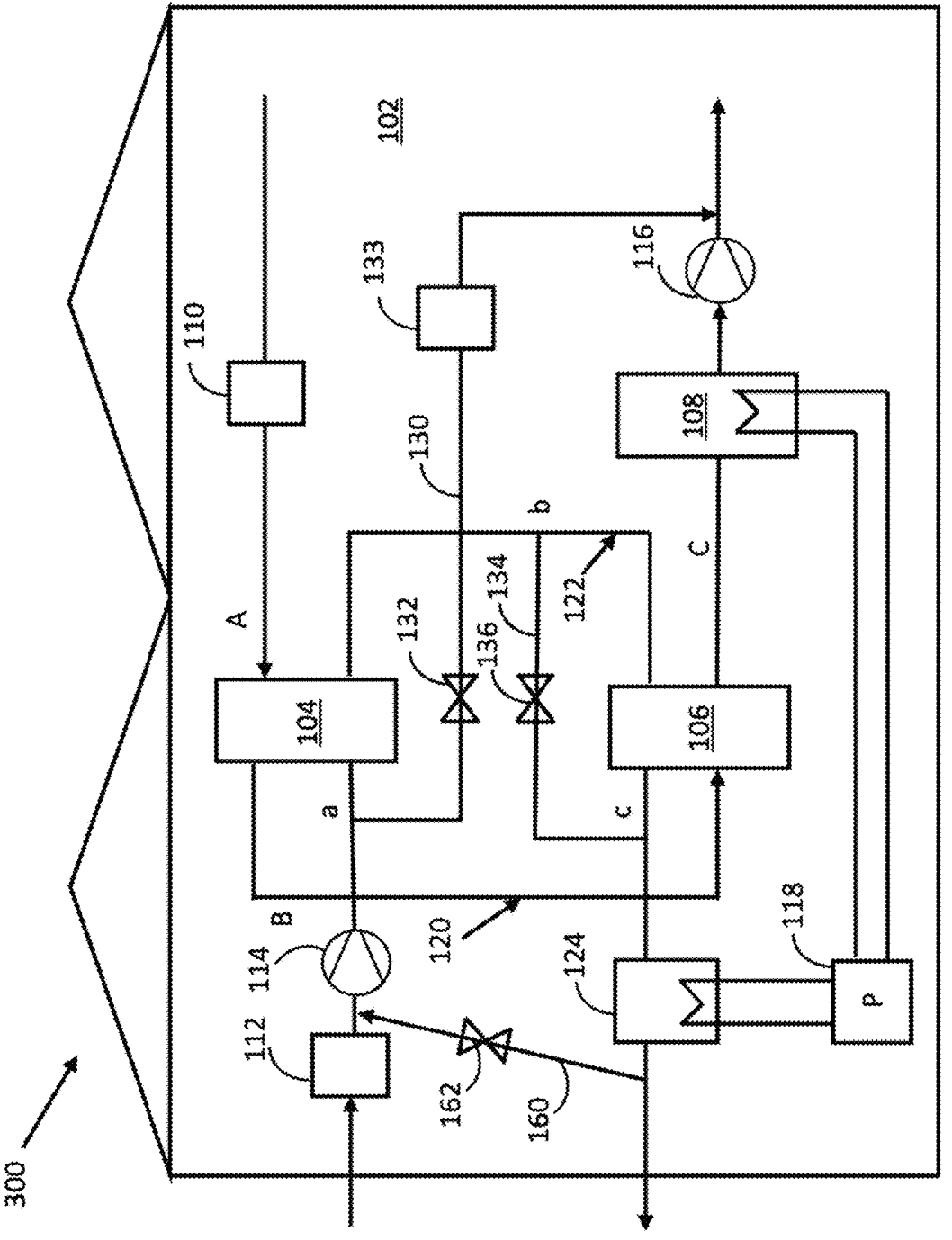
FIG. 3 shows another embodiment of the arrangement.

FIG. 3 shows another embodiment of the arrangement 300. The arrangement is very similar to the arrangement of FIG. 2, the only difference being that the greenhouse air flow and the respective equipment are arranged within the greenhouse. Also the ambient air flow path 122 is, to great extent, arranged within the greenhouse 300. In the embodiment shown, only the inlet and outlet of the ambient air flow are being connected to the ambient air but all devices, such as filters, valves, heat exchangers and pumps and heat pumps are within the greenhouse. Some hybrid solutions between the extremes of FIGS. 1 and 3 are possible where some equipment is within and some outside the greenhouse.

Figure 4:
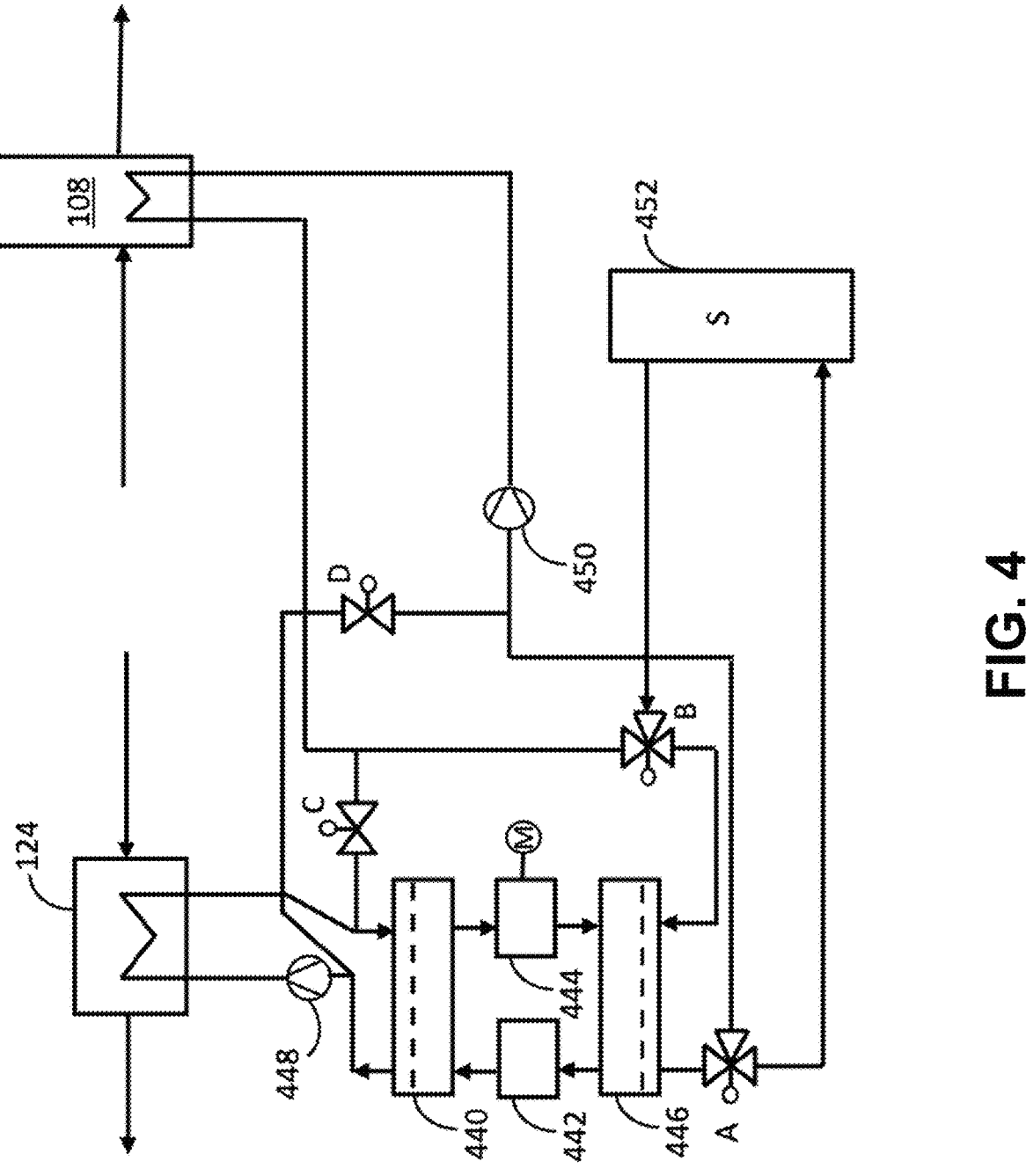
FIG. 4 shows an embodiment of a heat pump arrangement of the humidity and/or air temperature control arrangement.

FIG. 4 illustrates one embodiment of the heat pump structure the way of implementing the various operation modes, such as condensing and heat harvesting.

There are shown the third and fourth heat exchangers 108 and 124 respectively as in the other figures. There is provided a usual heat pump loop for circulating a refrigerant. The loop comprises an evaporator 440, compressor 444 run by a motor M, a condenser 446 and an expander 442. The dashed lines in the evaporator 440 and the condenser illustrate heat exchange relations between the refrigerant and ambient fluid flows. There is provided a pump 448, which circulates a fluid in the fourth heat exchanger 124 for collecting heat energy thereof and consequently evaporating the refrigerant in the evaporator 440. The flow, which may be water, is thus cooled in the evaporator before taking a new round in the fourth heat exchanger 124.

To the condenser 446, a cold fluid flow, which may also be water, may be directed for causing condensation when the cold fluid flow and by the compressor 444 heated gaseous refrigerant flow meet. The water flow receives thus energy in the condenser and is thereby heated.

FIG. 4 shows also valves A, B, C and D, a flow pump 450 and heat storage 452, which may be a water tank, for instance.

In the dehumidification operation mode where the greenhouse air flow has been condensed and thus cooled in two heat exchangers 104, 106, there may be a need to warm the greenhouse air flow in the third heat exchanger before returning the flow into the greenhouse. In this mode, the valves C and D are closed and the three-way valves A and B are in such a position that they allow circulation to and from the third heat exchanger 108 but the connections to the external heat storage are closed. For collecting energy, the heat pump thus circulates the fluid in the fourth heat exchanger 124 where the flow is heated, which energy is used in the evaporator 440 for heating the refrigerant. For releasing energy, the heat pump gives energy to the fluid flow in the condenser 446, which heat energy is then provided to the third heat exchanger 108 to heat the greenhouse air flow.

In the cooling and heat harvesting mode, the heat pump is arranged to collect energy from both heat exchangers 108 and 124. In this operation mode the valves C and D are opened. By opening valve D, the cold fluid exiting the evaporator 440 is partly led also the third heat exchanger 108 in addition to be partly led to the fourth heat exchanger as in the other mode. By opening valve C, the flow heated in the third heat exchanger is utilized in the evaporator 440 in addition to the flow received from the fourth heat exchanger. So in practice, in this operation mode, the flows that circulate in the third and fourth heat exchangers are combined when entering and exiting the evaporator.

Furthermore, in this operation mode, the external flow to the condenser is coming from the external heating system, such as an external heat storage 452. Thus, the flow from the heat storage will be heated in the condenser by utilizing energy received from the third and fourth heat exchangers 108, 124.

The arrangement may also comprise additional measurement devices and control logic for implementation of the embodiments. The measurement devices may comprise one or more temperature and/or humidity measurement devices in various places of the arrangement. The control logic, which may be implemented by software, may receive input signals from the measurement devices and perform control actions based on the measurement results as disclosed in the connection of the drawings. Such control actions may include actions such as opening/closing valves, control of the fans and operation of the heat pump related actions.

In an aspect, there is provided a method of dehumidification of greenhouse air wherein circulating greenhouse air in a greenhouse air flow. In the greenhouse air flow, there is provided a step of heat exchanging the greenhouse air against an ambient air flow in a first heat exchanger and also the step of heat exchanging the greenhouse air flow against an ambient air flow in a second heat exchanger wherein the greenhouse air flow and ambient air flow are received from the first heat exchanger.

It is clear that when the technology develops the inventive idea can be implemented in various ways. The invention and its embodiments are thus not limited to disclosed embodiments but can vary within the appended claims.

What is claimed is:

1. A control arrangement for controlling the temperature and/or humidity conditions of a greenhouse, comprising:
   first piping for receiving greenhouse air flow from the greenhouse and returning the greenhouse air flow back to the greenhouse;
   second piping for carrying an ambient air flow for circulating air originating exterior to the greenhouse;
   a first heat exchanger connected to the first and second piping for exchanging heat between the greenhouse air flow and the ambient air flow, the first heat exchanger being configured to remove moisture from the greenhouse air flow by condensation; and
   a second heat exchanger connected to the first piping to be fluidly connected in series with the first heat exchanger downstream of the first heat exchanger in the greenhouse air flow, the second heat exchanger being further connected to the second piping to be fluidly connected to the ambient air flow downstream of the first heat exchanger, wherein the second heat exchanger is provided for exchanging heat between the greenhouse air flow and the ambient air flow, the second heat exchanger being configured to remove moisture from the greenhouse air flow by adsorption.

2. The control arrangement of claim 1, further comprising a third heat exchanger connected to the first piping to be downstream of the second heat exchanger, the third heat exchanger being configured to heat the greenhouse air flow before the greenhouse air flow exits the first piping and is returned to the greenhouse.

3. The control arrangement of claim 2, further comprising a fourth heat exchanger for extracting heat energy from the ambient air flow downstream of the second heat exchanger.

4. The control arrangement of claim 3, further comprising a heat pump operationally connected to the third and fourth heat exchangers.

5. The control arrangement of claim 4, further comprising first auxiliary flow piping connected at a first end to the second piping, upstream of the first heat exchanger, to receive the ambient air flow, and connected at a second end to the first piping, downstream of the third heat exchanger, to combine the ambient air flow with the greenhouse air flow, and wherein a first valve is connected into the first auxiliary flow piping to control flow volume in the first auxiliary flow piping.

6. The control arrangement of claim 5, further comprising second auxiliary flow piping connected at a first end to the second piping, upstream of the second heat exchanger, and connected at a second end to the second piping, downstream of the second heat exchanger; and
   wherein a second valve is connected into the second auxiliary flow piping for controlling flow volume of the ambient air flow in the second auxiliary flow piping.

7. The control arrangement of claim 1, wherein the control arrangement is operable in a dehumidification operation mode, in which the first and second heat exchangers perform respective heat exchanging to thereby remove moisture from the greenhouse air flow.

8. The control arrangement of claim 4, wherein the control arrangement is operable in a dehumidification operation mode, wherein when the ambient temperature is below a predetermined temperature threshold that is representative of wintertime, the heat pump is configured to convey heat energy from the fourth heat exchanger to the third heat exchanger for warming the greenhouse air flow before returning to the greenhouse.

9. The control arrangement of claim 6, wherein the control arrangement is operable in a dehumidification operation mode, wherein when the ambient temperature is below a predetermined temperature threshold that is representative of wintertime, the second valve is cyclically controlled to open to allow ambient air flow from the first heat exchanger to bypass the second heat exchanger through the second auxiliary flow piping in order to defrost the fourth heat exchanger.

10. The control arrangement of claim 4, wherein the control arrangement is operable in a dehumidification operation mode, wherein when the ambient temperature is over a predetermined temperature threshold that is representative of summertime, the heat pump is configured to harvest heat energy from the third heat exchanger and the fourth heat exchanger, thereby cooling the greenhouse air flow; and
   wherein the heat pump is configured to store excess energy to an energy storage.

11. The control arrangement of claim 5, wherein the control arrangement is operable in a cooling and heat harvesting operation mode, wherein the second heat exchanger is either stopped or operated at less than 20% power from the nominal power, and the heat pump is configured to harvest heat energy from the third heat exchanger and the fourth heat exchanger, thereby cooling the greenhouse air flow; and
   wherein the heat pump is configured to store excess energy to an energy storage.

12. The control arrangement of claim 11, wherein the first valve is controlled to allow air flow via the first auxiliary flow piping.

13. The control arrangement of claim 4, further comprising a fan connected into the first piping, downstream of the third heat exchanger, to affect the greenhouse air flow, wherein the control arrangement is operable in a ventilation operation mode in which the only operational device is the fan affecting the greenhouse air flow.

14. The control arrangement of claim 6, further comprising:

third auxiliary flow piping connected at a first end to the second piping, downstream of the fourth heat exchanger, and connected at second end to the second piping, upstream of the first heat exchanger, the third auxiliary flow piping allowing cooled ambient air flow from the fourth heat exchanger to lower the temperature of the ambient air flow entering the first heat exchanger, thereby improving dehumidification performance of the first heat exchanger; and a valve for controlling ambient air flow in the third auxiliary flow piping.

15. A method of dehumidifying air in a greenhouse, comprising:

receiving greenhouse air flow from the greenhouse in a first heat exchanger;

exchanging heat between the greenhouse air flow and an ambient air flow in the first heat exchanger, wherein the first heat exchanger removes moisture from the greenhouse air flow by condensing;

receiving the greenhouse air flow and the ambient air flow in a second heat exchanger after the exchanging heat in the first heat exchanger;

exchanging heat between the greenhouse air flow and the ambient air flow in a second heat exchanger, wherein the second heat exchanger removes moisture from the greenhouse air flow by adsorption; and returning the greenhouse air flow to the greenhouse.

* * * * *